March 20, 1956  A. C. HUGIN  2,739,065
EDIBLE WHISTLE CANDY PRODUCTS
Filed April 7, 1953
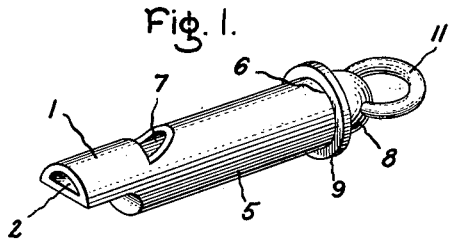
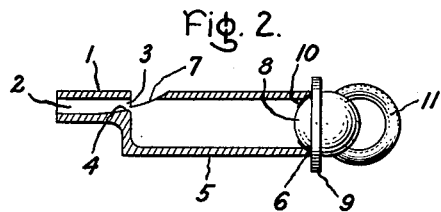
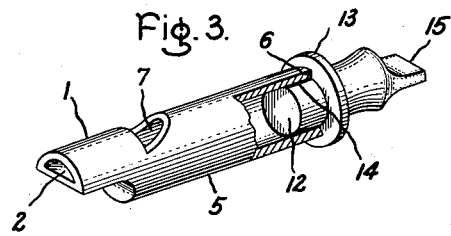
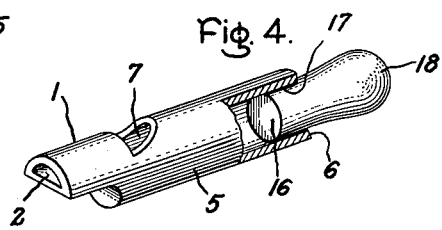
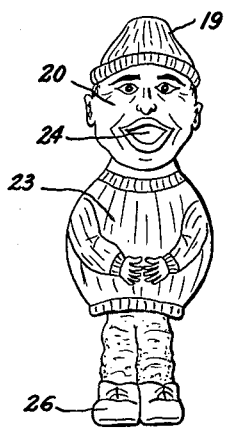
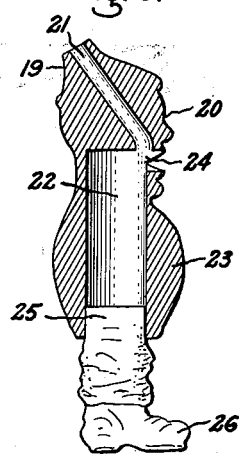
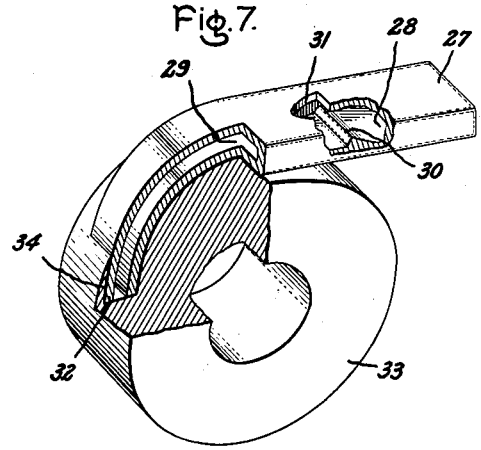
Inventor:
Adolph C. Hugin United States Patent Office 2,739,065
Patented Mar. 20, 1956

2,739,065

EDIBLE WHISTLE CANDY PRODUCTS

Adolph C. Hugin, Washington, D. C.

Application April 7, 1953, Serial No. 347,343

15 Claims. (Cl. 99—138)

My invention relates to whistles and more particularly to improved and novel edible whistle candy products and methods of making the same.

Whistles of edible food products, such as candy, including chewing gums, licorice, marshmallow, sweet-flavored waxy materials, nougat, and the like, can be made according to my invention into attractive entertainment articles having added appeal because of their tastefulness and esthetic appearance, while possessing practical characteristics for increasing cleanliness and comfort in handling them. These whistles can be formed into various shapes, such as the well-known "police" tubular whistles, compact ring or spiral type whistles, and into shapes of various bodies, like persons, real or imaginary, animals, and birds. The whistles all have a mouthpiece, constructed and adapted to be blown into, a sound chamber communicating with the mouthpiece and having a vent or opening therein at one end adjacent its communication with the mouthpiece, both made of a hard candy, and a closure and holding member, arranged to seal the end of the sound chamber opposite the mouthpiece, made of a candy material different from that of the mouthpiece and sound chamber. This different candy material should preferably be of a type which has a substantially non-sticky surface when it is not wet, such as chewing or bubble gum, nougat, licorice, marshmallow, and the like. In this manner the whistle sound members can be made of any desired flavor and color of hard candy, while the holding member can be of the different candy. In order to assure further against leakage of air from the sound chamber, a thin layer of hardened candy, such as caramel, may be placed between and in adhering engagement with adjacent surfaces of the sound chamber and the closure member.

An object of my invention is to provide an improved food-product whistle.

Another object of my invention is to provide a whistle formed of two different types of candy materials, one of which is a holding member formed of a material which has a non-sticky surface when substantially dry.

A further object of my invention is to provide an improved method of making a food-product whistle of candy materials.

Further objects and advantages of my invention will become apparent and my invention will be understood better from the following description referring to the accompanying drawing, and the features of novelty which characterize my invention will be pointed out with particularity in the claims annexed to and forming a part of this specification.

In the drawing, Fig. 1 is a perspective view of one embodiment of my invention in the form of a "police" or tubular type whistle.

Fig. 2 is a side view, partly in section, of the whistle shown in Fig. 1.

Fig. 3 is a perspective view, partly broken away, illustrating a further embodiment of my invention as a variation of that shown in Figs. 1 and 2.

Fig. 4 is a perspective view, partly broken away, illustrating a further embodiment of my invention as another variation of the types of whistles shown in Figs. 1, 2, and 3.

Fig. 5 is a front elevational view of an embodiment of my invention in the form of a person.

Fig. 6 is a side elevational view, partly broken away and in section, of the whistle shown in Fig. 5, and Fig. 7 is a perspective view, partly broken away, illustrating a still further embodiment of my invention in the form of a ring or spiral type whistle.

Referring to the drawing, I have shown, in Figs. 1, 2, 3, and 4, embodiments of my invention in which an edible food is formed of candy materials into attractive "police" or tubular type whistles. Each of these whistles comprises a member formed of any suitable hard or brittle candy having a mouthpiece portion 1 with an aperture or air passage 2 therein, which extends longitudinally therethrough and preferably terminates in a relatively restricted opening 3 formed by a bulge on the inner end 4 of the inner wall of the mouthpiece 1. This restricted opening 3 of the passage 2 in the mouthpiece is formed in communication with an edge of one end of a substantially cylindrical sound chamber 5, which preferably is made integral with and of the same material as the mouthpiece 1. The other end 6 of the sound chamber 5 from the mouthpiece is formed open and is sealed against air leakage by a suitable closure and holding member which may take various forms, three of which are shown in these figures. The sound chamber 5 is formed with an opening 7 therein adjacent the communication between the mouthpiece aperture 2 with the sound chamber. This sound chamber opening 7 is positioned relative to the communication between the mouthpiece and the sound chamber and to the closure member at the other end of the sound chamber, and considering the size of the sound chamber, so that a whistling sound or tone may be produced by blowing into the mouthpiece aperture.

In the embodiment illustrated in Figs. 1 and 2, the closure and holding member is formed of a different kind of candy material from that of the mouthpiece and sound chamber and may be a chewing or bubble gum, nougat, licorice, or other suitable candy material having a substantially non-sticky surface when dry. This assures a clean holding member which makes the product practical to handle and cleaner as a food. Making it of a different candy also adds to the tastefulness of the product, as it provides a variety in the candy as it is consumed. In these two figures, the closure member is formed by a ball-shaped member 8 with a collar 9 thereon, preferably larger in outer diameter than the outer diameter of the sound chamber 5. A portion of the ball-shaped closure 8 is arranged within the open end 6 of the sound chamber, substantially closing it as a plug with the inner side of the collar 9 in good sealing engagement with the adjacent edge of the sound chamber. In order further to assure against the leakage of air around the closure member, a thin layer of caramel 10 is arranged in good adhering engagement with the adjacent surfaces of the sound chamber and the ball-shaped closure member 8. Ease in holding the whistle is provided by a holding element 11 in the form of a section of a ring, made of the candy material of which the ball-closure member is made and preferably is formed integral therewith with the ends of the ring secured to the ball. This provides a tasteful candy variety in which the different candy materials may have an assortment of flavors and colors, in the form of an attractive toy whistle, made with a sanitary and comfortable holding part, which is safe from the hazards always associated with holding sticks of wood and similar materials.

The edible food-product whistle shown in Fig. 3 is provided with a handy closure and holding member formed of any desired suitable candy material having a substantially non-sticky surface when not wet. In this embodiment of my invention, the open end 6 of the sound chamber 5 is closed by a plug type closure element 12, which fits snugly in air-sealing engagement with the inner wall surface of the sound chamber 5 and may be provided with a collar 13 arranged in air-sealing engagement with the outer adjacent edge of the sound chamber. Preferably, the collar 13 is formed with a larger diameter than the outer diameter of the sound chamber and is integral with the plug closure element 12. Further assurance against air leakage may be provided by placing a thin layer of caramel 14 in good adhering engagement with adjacent surfaces of the plug element 12 and the sound chamber wall. This should be applied in a relatively liquid condition and should be of a consistency so that it will harden on cooling and standing. Holding of this whistle is facilitated by a specially shaped finger grip 15, formed preferably of the same material and integral with the plug closure element 12. This useful and attractive whistle possesses all of the favorable characteristics of the type shown in Figs. 1 and 2.

Fig. 4 illustrates a candy whistle having a simpler type of closure member, also forming the holding member for the whistle, and is arranged to seal the open end 6 of the sound chamber 5. In this product, a closure member 16, of the plug type, is inserted into snug engagement with the inner surface of the open end of the sound chamber. As in the before-described arrangements, further assurance against air leakage may be provided by placing a thin layer of caramel or similar candy material 17 between adjacent surfaces of the second chamber and the plug closure element 16. In this embodiment, a holding element 18 is simply a slightly enlarged part of the closure plug element 16, formed integral with and of the same material as the plug closure element, and having a substantially non-sticky surface when not wet. It is formed with an outer rounded end to add to its safety characteristics.

Esthetically, my candy whistles can be made very appealing to small children to give them added pleasure by making them in the forms of various bodies, one of which is illustrated in Figs. 5 and 6. In this embodiment, the mouthpiece and sound chamber are made of any desired hard candy in the form of a small person. A mouthpiece 19 forms most of a head 20 with an aperture or air passage 21 extending through the mouthpiece to an edge of one end of a cylindrical sound chamber 22 extending through a body portion 23 and into the adjacent end of the head portion 20. The sound chamber is formed with a vent or opening 24 therein at the end thereof where the aperture 21 communicates with the sound chamber. This opening 24 is formed in the head 20 as an open mouth and is positioned in relation to the aperture communication and a closure at the other end of the sound chamber such that a whistling sound or tone may be produced by blowing into the mouthpiece. A closure and holding member is formed as a plug member 25 in the shape of legs and feet 26, made of any suitable candy material, different from the head and body portions 20 and 23, and which is substantially non-sticky when not wet. The colors of the candy of this whistle can add greatly to the pleasure of children, and the two-kind of candy appeal, with the all-candy safety holding member make this type of product an important addition to childhood's dispensers of joys. A variety of shapes could be used to produce the effect of any desired type of body.

The broad scope of my invention is further illustrated in the Fig. 7 ring or spiral type whistle. In this embodiment, the mouthpiece and sound chamber are shown as of rectangular cross-section and are formed of any desired hard candy material. A mouthpiece 27 is formed with an aperture or air passage 28 therein, extending into communication with an edge of one end of a sound chamber 29. The passage 28 is narrowed or restricted at a point adjacent the communication by a bulge or boss 30 formed on the inner surface of the passage 28. A vent or opening 31 is formed in the sound chamber 29 near the communication between the mouthpiece and the sound chamber, positioned relative to this communication and to a closure at the other end of the sound chamber, so that a whistling sound or tone may be produced by blowing into the mouthpiece. In this product, the end of the sound chamber opposite the mouthpiece is sealed by a closure and holding member 33 in the form of a ring with a socket 34 in a side thereof into which the open end 32 of the sound chamber is snugly fitted into air-sealing relation. The closure and holding member 33 may be made of any desired candy material, such as gums, nougat, marshmallow and other candies, which have a non-sticky surface when not wet. This whistle is particularly safe and is especially well adapted to the use of a nougat or marshmallow closure and holding member.

While I have illustrated and described several embodiments of my invention, modifications thereof will occur to those skilled in the art. I desire it to be understood, therefor, that my invention is not to be limited to the particular arrangements disclosed, and I intend, in the annexed claims, to cover all modifications which do not depart from the spirit and scope of my invention.

What I claim as new and desire to secure by Letters Patent of the United States is:

1. A product comprising a member formed of a hard candy and having a mouthpiece with an aperture therein and a sound chamber with an air passage therein in communication with said mouthpiece aperture at one end thereof and open at the other end thereof, and means including a closure and holding member formed of another kind of candy arranged with a portion thereof in air sealing engagement with said open other end of said sound chamber, said sound chamber having an opening therein positioned in relation to said mouthpiece communication with said sound chamber and to said closure member whereby a sound may be produced by blowing into said mouthpiece aperture.

2. A product comprising a member of a hard candy and having a substantially cylindrical sound chamber and a mouthpiece with an aperture therein in communication with an edge of said sound chamber at one end thereof, said sound chamber having an opening therein positioned and formed adjacent said communication between said mouthpiece with said sound chamber whereby a sound may be produced by blowing in said mouthpiece aperture, and means including a closure member formed of another type of candy arranged in air sealing engagement with the other end of said sound chamber from said mouthpiece.

3. A product comprising a member formed of hard candy and having a substantially cylindrical sound chamber and a mouthpiece with an aperture therein in communication with an edge of said sound chamber at one end thereof, said sound chamber having an opening therein adjacent said communication between said mouthpiece aperture with said sound chamber whereby a sound may be produced by blowing into said mouthpiece aperture, and means including a closure member formed of another type candy substantially non-sticky when dry with a portion thereof arranged within the end of said sound chamber opposite said mouthpiece for closing said latter end of said sound chamber.

4. A product comprising a member formed of a hard kind of candy and having a mouthpiece with an aperture therein and a sound chamber with an air passage therein in communication with said mouthpiece aperture at one end thereof and open at the other end thereof, and means including a closure member formed of another kind of candy in the shape of a holding ring arranged with a portion thereof in air sealing engagement with said open other end of said sound chamber, said sound chamber having an opening therein positioned in relation to said mouthpiece communication with said sound chamber and to said closure member whereby a sound may be produced by blowing into said mouthpiece aperture.

5. A product comprising a member formed of a hard candy and having a substantially cylindrical sound chamber and a mouthpiece with an aperture therein in communication with an edge of said sound chamber at one end thereof, said sound chamber having an opening therein adjacent said communication between said mouthpiece aperture with said sound chamber whereby a sound may be produced by blowing into said mouthpiece aperture, means including a closure member formed of a bubble gum in the shape of a ball with an annular collar thereon larger in diameter than the diameter of said sound chamber and arranged with a portion of said closure member within the other end of said sound chamber from said mouthpiece with said collar in engagement with the adjacent edge of said other end of said sound chamber for substantially closing said other end of said sound chamber, and a holding element in the form of a section of a ring formed of said bubble gum with the ends thereof secured to said ball closure member.

6. A food product comprising a member formed of a hard kind of candy and having a mouthpiece with an aperture therein and a sound chamber with an air passageway therein in communication with said mouthpiece aperture at one end thereof and open at the other end thereof, means including a closure member formed of licorice candy in the form or a plug arranged with a portion thereof within said open other end of said sound chamber for substantially sealing said other end of said sound chamber against leakage of air therefrom, and a holding element formed of said licorice candy extending outwardly from said closure member, said sound chamber having an opening therein positioned in relation to said mouthpiece aperture and to said closure member whereby a sound may be produced by blowing into said mouthpiece aperture.

7. A method of making a food product comprising forming of a hard candy a member having a mouthpiece with an aperture therein and a sound chamber with an air passageway therein in communication with the mouthpiece aperture at one end thereof and open at the other end thereof and forming an opening in the sound chamber positioned in relation to the mouthpiece aperture and the other end of the sound chamber so that when the other end of the sound chamber is closed and air is blown into the mouthpiece aperture a sound is produced, and sealing the other end of the sound chamber with a closure member formed of a bubble chewing gum made in the shape of a plug larger at one diameter than the open end of the sound chamber and inserting the smaller end of the plug into the open other end of the sound chamber.

8. A food product comprising a member formed of a hard kind of candy and having a mouthpiece with an aperture therein and a sound chamber with an air passageway therein in communication with said mouthpiece aperture at one end thereof and open at the other end thereof, and means including a closure member formed of another kind of candy arranged with a portion thereof within said open other end of said sound chamber for substantially sealing said open other end of said sound chamber against leakage of air therefrom, said sound chamber having an opening therein positioned in relation to said mouthpiece aperture and to said closure member whereby a sound may be produced by blowing into said mouthpiece aperture.

9. A food product whistle comprising a member formed of a hard kind of candy and having a mouthpiece with an aperture therein and a sound chamber with an air passageway therein in communication with said mouthpiece aperture at one end thereof and open at the other end thereof, and means including a closure member formed of another kind of candy in the shape of a plug arranged with a portion thereof within said open other end of said sound chamber for substantially sealing said other end of said sound chamber against leakage of air therefrom, and a holding element formed of said other kind of candy extending outwardly from said closure member, said sound chamber having an opening therein positioned in relation to said mouthpiece aperture and to said closure member whereby a sound may be produced by blowing into said mouthpiece aperture.

10. A whistle comprising a member formed of hard candy and having a body portion with a sound chamber therein and a head member with a mouthpiece having an aperture in the top thereof in communication with an edge of said sound chamber at one end thereof, said sound chamber extending to said head member and having an opening therein forming an open mouth for said head member arranged adjacent said communication between said mouthpiece aperture and said sound chamber whereby a sound may be produced by blowing into said mouthpiece, and means including a closure member formed of another type of candy arranged with a portion thereof in air sealing engagement with the other end of said sound chamber from said mouthpiece.

11. A whistle in the form of a person comprising a member formed of hard candy and having a body portion with a sound chamber therein and a head member with a part forming a mouthpiece with an aperture therein in the top thereof in communication with an edge of said sound chamber at an end thereof, said sound chamber extending to said head member and having an opening therein forming an open mouth for said head member arranged adjacent said communication between said mouthpiece and said sound chamber, and means including a closure member formed of another kind of candy in the shape of legs and feet arranged with a portion thereof as a plug within the other end of said sound chamber from said mouthpiece for substantially sealing said other end of said sound chamber against leakage of air therefrom.

12. A food product comprising a member formed of a hard type candy and having a mouthpiece with an aperture therein and a sound chamber with an air passageway therein in communication with said mouthpiece aperture at one end thereof and open at the other end thereof, means including a closure member formed of another type of candy arranged with a portion of said closure member within said other end of said sound chamber for substantially closing said other end of said sound chamber, a holding element formed of said other type of candy with an end thereof secured to said closure member, said sound chamber having an opening therein positioned in relation to said mouthpiece aperture and to said closure member whereby a sound may be produced by blowing in said mouthpiece aperture, and means including a candy material in a thin layer between and in adhering engagement with adjacent surfaces of said sound chamber and said closure member for sealing said other end of said sound chamber against leakage of air from said other end of said sound chamber.

13. A food product comprising a member formed of a hard sugar candy and having a mouthpiece with an aperture therein and a sound chamber with an air passageway therein in communication with said mouthpiece aperture at one end thereof and open at the other end thereof, means including a closure member formed of a bubble gum with a collar thereon larger in outer diameter than said sound chamber and arranged with a portion of said closure member within said other end of said sound chamber and with said collar in engagement with the adjacent edge of said other end of said sound chamber for substantially closing said other end of said sound chamber, a holding element in the form of a section of a ring formed of said bubble gum with the ends thereof secured to said closure member, said sound chamber having an opening therein positioned in relation to said mouthpiece aperture and to said closure member whereby a sound may be produced by blowing into said mouthpiece aperture, and means including a sugar candy in a thin layer between and in adhering engagement with adjacent surfaces of said sound chamber and said closure member for sealing said other end of said sound chamber.

14. A food product comprising a member formed of a hard candy and having a mouthpiece with an aperture therein and a cylindrical sound chamber with an air passageway therein in communication with said mouthpiece aperture at one end thereof and open at the other end thereof, means including a closure member formed of a bubble gum in the shape of a ball with an annular collar thereon larger in outer diameter than the outer diameter of said sound chamber and arranged with a portion of said closure member within said other end of said sound chamber and with said collar in engagement with the adjacent edge of said other end of said sound chamber for substantially closing said other end of said sound chamber, a holding element in the form of a section of a ring formed of said bubble gum with the ends thereof secured to said ball closure member, said sound chamber having an opening therein positioned in relation to said mouthpiece aperture and to said closure member whereby a sound may be produced by blowing into said mouthpiece aperture, and means including a candy material in a thin layer between and in adhering engagement with adjacent surfaces of said sound chamber and said closure member for sealing said other end of said sound chamber against leakage of air from said other end of said sound chamber.

15. A food product comprising a member formed of a hard brittle sugar candy and having a mouthpiece with an aperture therein and a cylindrical sound chamber with an air passageway therein in communication with said mouthpiece aperture at one end thereof and open at the other end thereof, means including a closure member formed of a bubble chewing gum in the shape of a ball with an annular collar thereon larger in outer diameter than the outer diameter of said sound chamber and arranged with a portion of said closure member within said other end of said sound chamber with said collar in engagement with the adjacent edge of said other end of said sound chamber for substantially closing said other end of said sound chamber, a holding element in the form of a section of a ring formed of said bubble chewing gum with the ends thereof secured to said ball closure member, said sound chamber having an opening therein positioned in relation to said mouthpiece aperture and to said closure member whereby a sound may be produced by blowing in said mouthpiece aperture, and means including a hardened sugar caramel candy in a thin layer between and in adhering engagement with adjacent surfaces of said sound chamber and said closure member for sealing said other end of said sound chamber against leakage of air from said other end of said sound chamber.

References Cited in the file of this patent

UNITED STATES PATENTS

| 575,206 | Britton | Jan. 12, 1897 |
| 1,581,772 | Williams | Apr. 20, 1926 |
| 1,652,789 | Moore | Dec. 13, 1927 |

FOREIGN PATENTS

| 8,411 | Switzerland | May 19, 1894 |
| 9,897 | Great Britain | 1907 |
| 242,523 | Great Britain | Nov. 12, 1925 |
| 302,303 | Great Britain | Dec. 14, 1928 |